J. CADWELL.
GRAIN FLOW REGULATOR.
APPLICATION FILED JAN. 21, 1919.
1,334,929.
Patented Mar. 23, 1920.
2 SHEETS—SHEET 2.
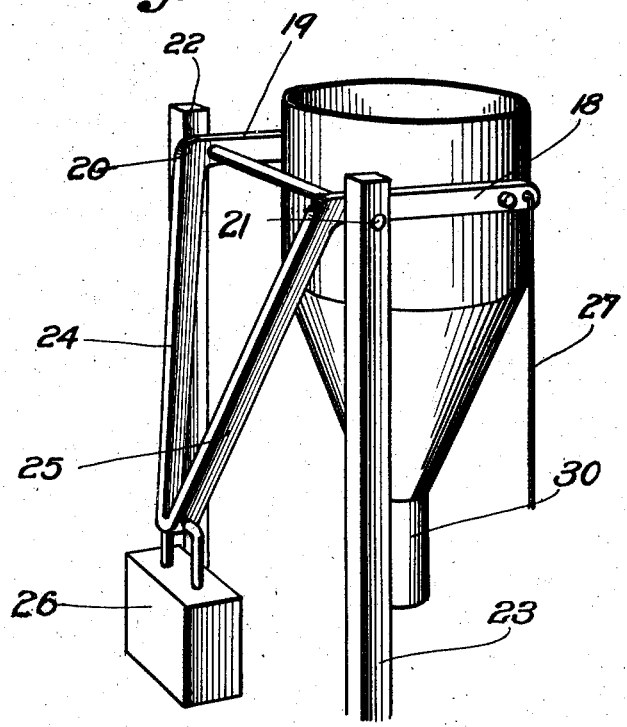
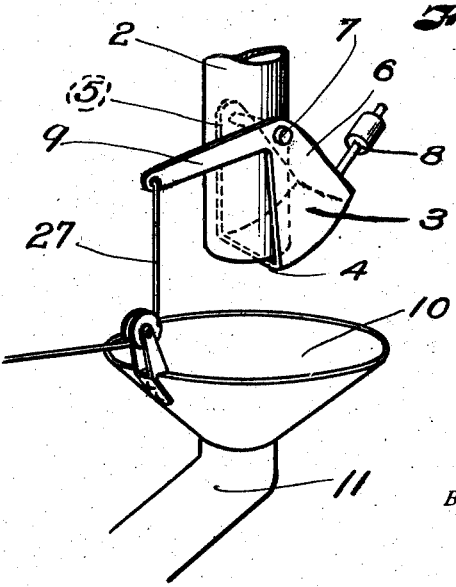
INVENTOR
John Cadwell.
BY Arthur O. Brown.
ATTORNEY

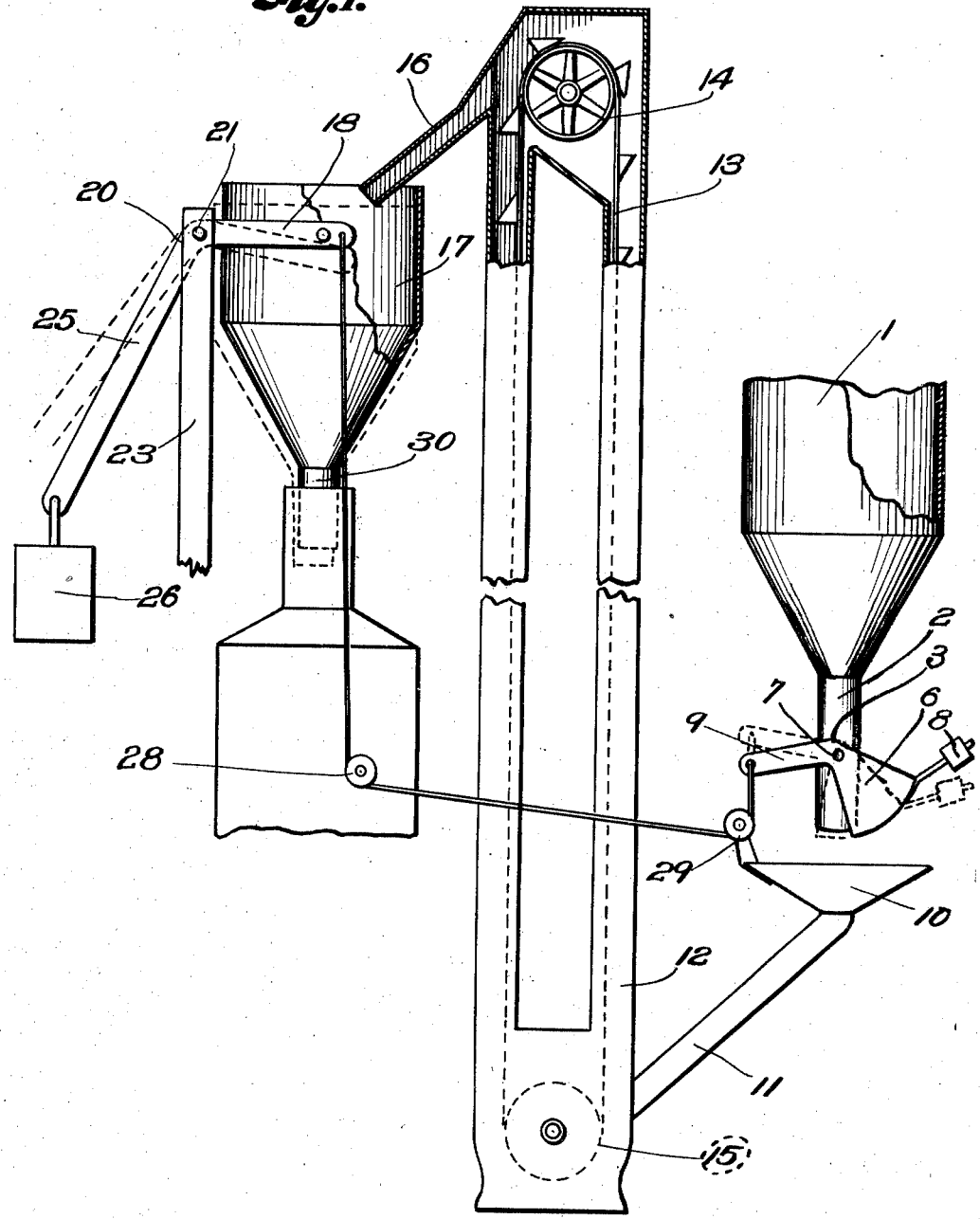

UNITED STATES PATENT OFFICE.

JOHN CADWELL, OF ATTICA, KANSAS.

GRAIN-FLOW REGULATOR.

1,334,929.   Specification of Letters Patent.   Patented Mar. 23, 1920.

Application filed January 21, 1919. Serial No. 272,288.

*To all whom it may concern:*

Be it known that I, JOHN CADWELL, a citizen of the United States, residing at Attica, in the county of Harper and State of Kansas, have invented certain new and useful Improvements in Grain-Flow Regulators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a regulating mechanism for controlling the flow of wheat in a flour mill and one of the objects of the invention is to control the flow of wheat from one receptacle or container to another in such manner that liability of choking or retardation of the flow due to piling up of the wheat in transit will be eliminated.

Specifically, the invention contemplates the provision of means for proportioning the flow of the wheat from one receptacle in inverse ratio to the accumulation of the wheat in the other receptacle. In other words, the discharge of wheat from the first receptacle may initially be the maximum, provided there is no wheat in the second receptacle but as the second receptacle begins to fill, the flow from the first receptacle will be gradually retarded until by the time the second receptacle is full, the discharge from the first receptacle will be cut off. In this manner, the flow of the wheat in transit from one receptacle to the other will be so regulated that liability of the conveyer becoming choked will be reduced to a minimum, if not wholly avoided.

The invention may partake of various details in form, proportion and minor details of construction but for the purpose of illustration I have selected what, at this time, appears to be the simplest form of the same.

In the drawings,

Figure I is a view partly in elevation and partly in section of a mechanism embodying my invention.

Fig. II is a detail perspective view of a hopper for controlling the flow of the wheat, and Fig. III is a detail perspective view of the valving mechanism for the discharge end of the bin.

Referring now to the drawings by numerals of reference:

1 designates a receiving bin for wheat or the like provided at its bottom with a discharge spout or tube 2 to which is pivoted a swinging cut-off valve 3. The specific construction of the valve 3 is best shown in Fig. III as comprising an arcuate blade 4 provided along its side edges with right angularly projecting arms 5 and 6 supported upon the pivot member 7 which passes through them and through the spout 2. A counter-balance weight 8 is connected to the rear edge of the blade 4 so as to tend to maintain the valve in its closed position. On one of the arms is a lever 9 to which a suitable cord or cable may be attached to exert a force opposed to the weight 8. The valve may be conveniently struck from a single piece of metal and bent up to the form shown although it may be cast if desired.

The spout or nozzle 2 is adapted to discharge into a hopper 10 and then pass into a conduit 11 in communication with the bottom of the conveyer casing 12. The conveyer casing 12 contains a known form of belt and bucket conveyer; the belts 13 pass over the pulleys 14 and 15 in the usual way and empty into an inclined discharge 16 above the hopper 17. The hopper 17 is pivotally connected to the arms 18 and 19 of the frame 20, likewise pivoted at 21 in the standards 22 and 23. The frame 20 may consist of a strip or rail bent intermediate its ends to provide diverging portions 24 and 25 terminating in the substantially right-angular, forwardly projecting arms 18 and 19. At the angle of the frame is the counter-balance weight 26 as shown in Figs. I and II. On one of the arms, in this instance shown as the arm 18, is connected a cord or cable which passes around an idle pulley 28 upon a suitable support and around a suitable pulley 29 and which is fastened at its end to the arm 9 of the valve 4.

Assuming the parts to be assembled as shown in Fig. I and the hopper 17 empty, it will be only necessary to supply wheat to the receiving bin 1 and since the weight 26 preponderates over the weight 8, the hopper 17 will be in a raised position so as to exert a pull on the cord 27 to overcome the balance weight 8 and open the valve 4 to its fullest extent. Wheat will then be admitted into the hopper 10, conduit 11, elevator 12, discharge 16 and hopper 17. If the flow is great enough to cause the hopper 17 to begin to fill faster than it can discharge from its spout 30, the weight of the hopper plus the wheat will overcome the balance weight 26 and slightly raise it. This will be effective in providing slack for the cord 27 to be taken up by the counterbalance weight 8, resulting in a partially closing off of the spout 2 of the receiving bin 1. As the level of the wheat in the hopper 17 rises, more slack will be provided for the cord 27 and consequently the closing off action of the valve 4 will progress until the bin 1 is completely valved. Since there is no valve in the spout 30 of hopper 17, it is obvious that just as soon as the wheat has exhausted from the hopper 17 sufficiently to permit the weight 26 to raise the hopper, the valve 4 will be permitted to have an opening movement so that the flow of grain from the bin 1 will be established.

It will therefore be apparent that the wheat may be conveyed from one receptacle to another receptacle in variable quantitative flows dependent upon the accumulation at the receiving receptacle and in such manner that liability of choking in the system will be eliminated.

Having thus described my invention, what I claim as new therein, and desire to secure by Letters-Patent is:

1. In a device for regulating the flow of grain, in combination, an elevator, a valved spout for delivering grain to the elevator below the top thereof, a hopper for receiving grain from the discharge end of the elevator, a support, a member pivoted to said support and having horizontally projecting arms to which the hopper is pivoted, a weight connected to the member, the weight of which is opposed to the weight of the hopper, and a connection between one of the arms and the valve whereby a downward movement of the hopper will impart a closing movement to the valve in proportion to the movement of the hopper.

2. In a device for regulating the flow of grain, in combination, an elevator, a valved spout for delivering grain to the elevator below the top thereof, a hopper for receiving grain from the discharge end of said elevator, a support, a pivoted member carried by the support and having means at one end for supporting the hopper, a weight connected to the other end of said pivoted member, the weight of which is opposed to the weight of the hopper, and a connection between the pivoted member and the valve whereby a downward movement of the hopper will impart a closing movement to the valve in proportion to the movement of the hopper.

3. In a device for regulating the flow of grain, in combination, an elevator, a valved spout for delivering grain to the elevator below the top thereof, a hopper for receiving grain from the discharge end of said elevator, a support, a V-shaped member pivoted to said support and having horizontally projecting arms to which the hopper is pivoted, a weight connected to the V-shaped member, the weight of which is opposed to the weight of the hopper, and a flexible connection between one of the arms and the valve whereby a downward movement of the hopper will impart a closing movement to the valve in proportion to the movement of the hopper.

4. In a device for regulating the flow of grain, in combination, an elevator, a valved spout for delivering grain to the elevator below the top thereof, a hopper for receiving grain from the discharge end of said elevator, a support, a V-shaped member pivoted to said support and having horizontally projecting arms to which the hopper is pivoted, a weight connected to the V-shaped member, the weight of which is opposed to the weight of the hopper, a flexible connection between one of the arms and the valve whereby a downward movement of the hopper will impart a closing movement to the valve in proportion to the movement of the hopper, and a counterbalancing weight on the valve for the spout tending to impart a closing movement to the valved spout.

In testimony whereof I affix my signature

JOHN CADWELL.